June 5, 1962  A. B. SEGUR  3,037,644
SEMI-AUTOMATIC HACKING MACHINE
Filed June 2, 1960  11 Sheets-Sheet 1

INVENTOR
A. B. SEGUR
BY Fetherstonhaugh & Co.
ATTORNEYS

June 5, 1962  A. B. SEGUR  3,037,644
SEMI-AUTOMATIC HACKING MACHINE
Filed June 2, 1960  11 Sheets-Sheet 4

INVENTOR
A.B. SEGUR
BY Fetherstonhaugh & Co.
ATTORNEYS

June 5, 1962 A. B. SEGUR 3,037,644
SEMI-AUTOMATIC HACKING MACHINE
Filed June 2, 1960 11 Sheets-Sheet 5

INVENTOR
A.B. SEGUR
BY Featherstonhaugh & Co
ATTORNEYS

June 5, 1962 A. B. SEGUR 3,037,644
SEMI-AUTOMATIC HACKING MACHINE
Filed June 2, 1960 11 Sheets-Sheet 8

Fig. 19

INVENTOR
A. B. SEGUR
BY Fetherstonhaugh & Co.
ATTORNEYS

June 5, 1962  A. B. SEGUR  3,037,644
SEMI-AUTOMATIC HACKING MACHINE
Filed June 2, 1960  11 Sheets-Sheet 10

INVENTOR
A.B. SEGUR
BY Fetherstonhaugh Co.
ATTORNEYS

United States Patent Office 3,037,644
Patented June 5, 1962

3,037,644
SEMI-AUTOMATIC HACKING MACHINE
Asa Bertrand Segur, Oak Park, Ill., assignor to Dominion Tar & Chemical Company, Limited, Montreal, Quebec, Canada
Filed June 2, 1960, Ser. No. 33,541
19 Claims. (Cl. 214—6)

This invention relates to the manufacture of bricks and more particularly to the automatic transfer, sorting and arrangement of green bricks between the brick presses and a central hacking station, in which the bricks are formed into hacks and thence transferred on to kiln cars for transportation to the brick kilns.

The invention consists essentially in means whereby the pressed green bricks are withdrawn automatically from the bed of the brick presses on to a conveyor for temporary storage and lateral movement and the transfer of the bricks in pairs on to a main conveyor; arranging the pairs of bricks into a group on the conveyor opposite the receiving end of longitudinal and transverse hacking stations; removing the group of bricks from the main conveyor and laying them on edge in double layers on the hacking stations to form a hack, and finally transferring the formed hacks on a kiln car for transporting to the brick kilns.

In the present invention the gathering and grouping of the green bricks is synchronized from the presses to the hacking station in order that the bricks from a number of brick presses will arrive at the central hacking station in an even flow, and by means of suitable automatically set stops and counters, the bricks can be directed to in front of and on to either longitudinal or transfer hack forming machines in the central hacking station from which the formed hacks can be removed semi-automatically and be delivered to the kiln cars in the desired hack pattern.

Hitherto it has been the practice in brick making plants to have the empty kiln cars rolled alongside the delivery side of the brick presses and to have one or two men pick up by hand the bricks formed in the press, and stack the bricks on the kiln car in the desired pattern of hack. This operation was time consuming and resulted in uneven stacking of the bricks on the kiln car. The stacking of the bricks on the kiln car in a predetermined pattern of hacks is essential (a) to provide proper spacing between the bricks to allow uninterrupted horizontal and vertical passages for the flow of heating and cooling gases, (b) expose as large an area of all surfaces of the bricks as possible to the heating and cooling gases, and (c) to ensure that a sufficient tie is provided between the bricks in the built up stack, so that, as the kiln car is inched through the kiln there will be no falling apart of the bricks from the stack and so disrupt the whole time cycle of the passage of the cars through the kiln, while the fallen bricks are cleared from the kiln.

The manual handling of the green bricks between the brick press and the kiln car while the bricks are relatively soft, lends itself to considerable spoilage, such as the chipping of the edges of the bricks, which spoilage is often not detected until after the bricks have been fired.

Where the output from a number of bricks presses are being manually set up on kiln cars, the rate of loading individual kiln cars can vary considerably resulting in an uneven flow of the cars to the kiln.

The object of the invention is to eliminate entirely any direct manual handling of green bricks between brick press and kiln.

A further object of the invention is to sort and arrange in synchronized sequence the passage of the bricks from the brick presses to the kiln cars in order to form hacks of bricks in a desired pattern which will facilitate the firing of the bricks in the kiln.

A further object of the invention is to obtain an improved and even spacing of the bricks in the built up hack stack in order to secure a proper tie between transverse and longitudinal hacks and ensure stability of the stack on the kiln car.

A further object of the invention is to automatically receive a continuous flow of bricks from a number of brick presses and to load the bricks on to a kiln car at a central station to obtain a uniform flow of loaded cars.

A further object of the invention is to provide coordinate controls at various stages of the transfer of the bricks from the brick presses to the hacking station whereby the bricks can be grouped and re-aligned for final assembly in a hack of desired pattern.

A further object of the invention is to provide means whereby elements of a similar nature to conventional oblong building bricks, such as pressed or extruded blocks, tiles of various sizes and shapes and pressed or extruded refractory bricks and shapes can be automatically transferred from their formation stage to the firing kiln.

These and other objects of the invention will be apparent from the following detailed description of the invention and from the accompanying drawings, in which.

Figure 1:
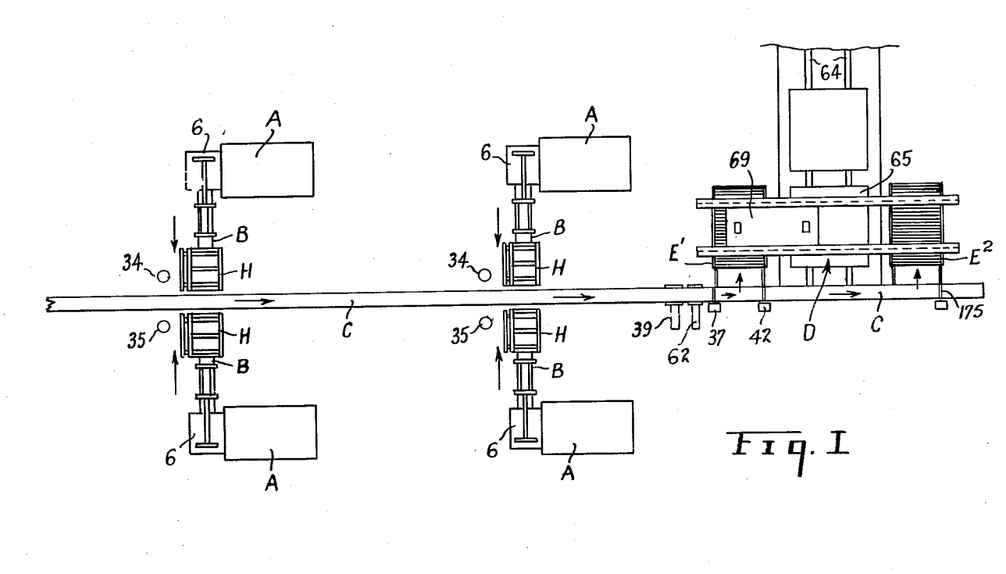
FIG. 1 is a plan view of a typical layout showing the flow path of the green bricks from the brick presses to the hacking stations and kiln cars.
Figures 2, 3:
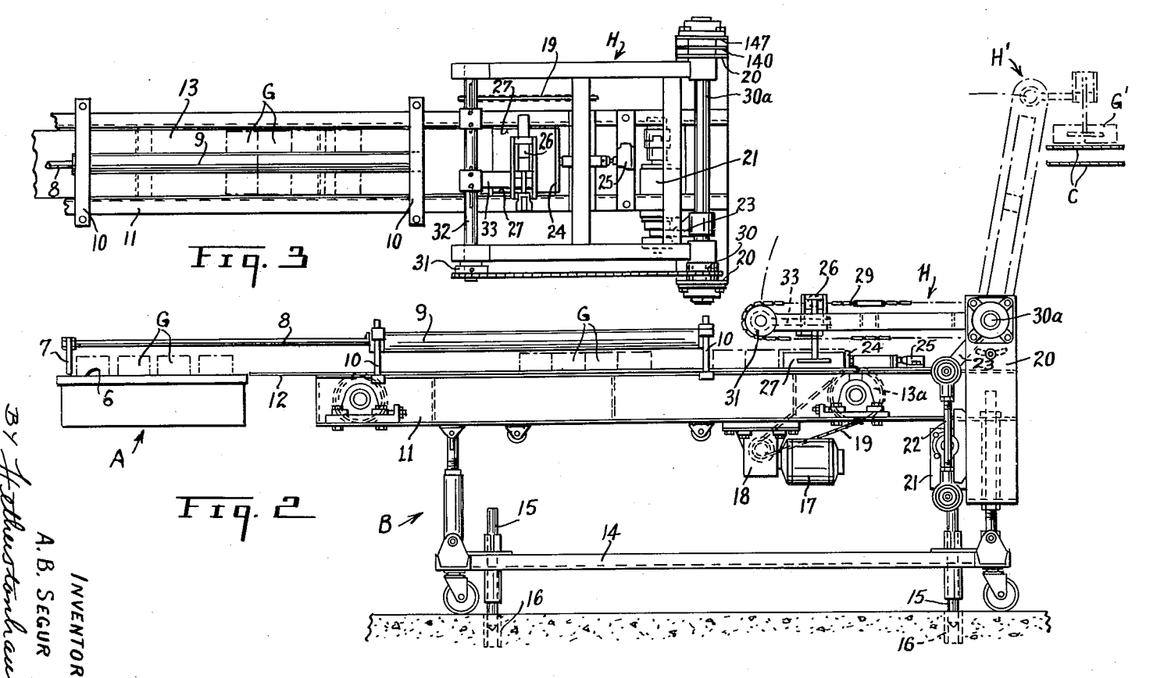
FIG. 2 is a side elevation of that transfer machine element of the invention by means of which the bricks are withdrawn from the brick press and transferred in pairs to the main conveyor belt.
FIG. 3 is a partial plan view of the transfer machine element shown in FIG. 2.

Referring to the drawings, FIG. 1 is a plan view of a typical layout of the elements of the present invention and shows a series of brick presses A in which the bricks are pressed into shape. The green bricks are automatically withdrawn from the brick presses A by the transfer machines B which are then transferred in pairs on to the main conveyor C. Where more than one brick press A is in operation, the transfer machines B are synchronized so that the transfer of pairs of bricks on to the conveyor C are equally spaced on the conveyor. The main conveyor C feeds the pairs of bricks at regular intervals to the central hacking station D where a group of the pairs of bricks are brought together and are turned on edge through 90° on to the machine elements E where two courses of bricks, one above the other, are formed and, when the hack of bricks has been completed on the machine elements E, the complete hacks are lifted off and are transferred on to the kiln car F for transfer to the firing kiln, which is not shown.

Referring now to the detail drawings FIGS. 2 to 18. The green bricks G are withdrawn from the bed 6 of the brick presses A and transferred in pairs on to the conveyor belt C by means of the brick transfer machine B. The green bricks G are withdrawn from the bed 6 of the brick press A by the shuttle plate 7 which is secured on the end of the rod 8 extending from the cylinder and piston device 9. This cylinder and piston device 9 is mounted on the supports 10 forming part of the frame 11 of the transfer machine B and is operated by suitable solenoid operated valves, as will be explained hereafter.

As the rod 8 and shuttle plate 7 are retracted by the cylinder and piston device 9 the bricks G on the bed 6 of the press A are raked over the spacer plate 12 and on to the constantly moving conveyor belt 13 of the machine B. At the end of the withdrawing stroke of the cylinder and piston device 9 the rod 8 and shuttle plate are immediately extended towards the bed of the press ready for a repeat cycle of withdrawing the bricks from the press when called upon by controlling mechanism located at the press.

The frame 11 of the transfer machine B is preferably mounted on a trolley 14 and the whole machine can be anchored in place relative to the press A and the main conveyor C by means of the dowels 15 lowered into the floor sockets 16. The conveyor belt is constantly driven by the motor 17, reduction gear 18 and chain drive 19.

A transfer arm assembly H is pivotally mounted between the uprights 20 extending from the frame 11 of the machine B. This transfer arm assembly H is rotatable through an arc of a little more than 90°, into the position shown in chain dot lines at H', in FIG. 2 by means of the torque actuator 21 acting through the linkage 22 and lever 23. Wherever in this specification the term "torque actuator" is used, it is taken to mean any form of torque actuated mechanism which will oscillate through a predetermined arc and operated through suitable valves in the manner described later in connection with a detailed description of the operation of the complete apparatus.

The stop bar 24, located above the belt 13 near the end of its forward travel, is moved slightly by pressure from the first brick moving against it, the movement of the stop bar 24 acts to close a micro switch 25 to effect activation of the cylinder and piston device 26 through suitable solenoid operated valves to bring the clamp plates 27 into clamping engagement with the first pair of bricks, and simultaneously energize the torque actuator 21 to pivot the transfer arm assembly H into the position H'. The cylinder and piston device 26 in its clamping position energizes the torque actuator 131 to momentarily reverse the drive from the motor 17 to the conveyor belt 13 to effect separation of the column of bricks on the belt 13 from the pair of bricks between the clamp plates 27 to make it possible to withdraw and lift up the clamped pair of bricks. A drive chain 29 engages with a stationary sprocket 30 at the pivot shaft 30a of the transfer arm assembly H and with a sprocket 31 on the shaft 32 bridging the opposite end of the transfer arm assembly. The cylinder and piston device 26 is supported on the bracket 33 mounted on and rotating with the shaft 32. As the transfer arm assembly H is rotated from the horizontal position shown in FIG. 2 into the position H', the sprocket 31, shaft 32, bracket 33 and cylinder and piston device 26 and the clamped pair of bricks are rotated anti-clockwise to bring the clamped bricks into position shown at H' over the main conveyor C.

A light unit 34 sending a light beam across the main conveyor C in line with a photo-electric switch 35 controls the movement of the transfer arm assembly H at the last part of its vertical movement so as to effect separation of the clamp plates 27 and deposit the pair of bricks only on the conveyor C whenever there is a vacant place for them on it. If the light beam is interrupted by bricks already on the conveyor C from other transfer machines B and presses A, the transfer arm assembly H is stopped and waits for the empty belt signal to continue the vertical swing into the position H'.

Upon completion of the vertical travel of the transfer arm assembly H into the position H' the torque actuators 21 and 28 are actuated in a reverse direction which in turn retracts the cylinder and piston device 26 to unclasp the pair of bricks, allowing them to rest freely on the conveyor belt C, and return the transfer arm assembly H to its original position horizontally above the belt 13.

The sequence of transferring a pair of bricks from the belt 13 to the main conveyor belt C will be repeated immediately if there is another pair of bricks against the stop bar 24. If not, the transfer arm assembly H will remain in its horizontal position waiting to be called upon by closing of the switch 25 by slight movement of the stop bar 24.

The purpose of the main conveyor C is to convey all the bricks in pairs deposited on it previously by the transfer machines B, into the hacking station D.

The purpose of the machine elements in the hacking station D is to receive bricks from the conveyor C, the bricks being laid flat, end to end in two rows on the conveyor, and to automatically group a series of the bricks in a column G' in front of either one or other of the machine elements E in the hacking station and to automatically transfer these groups of bricks on to the machine elements $E^1$ and $E^2$ to form the required hack of two courses high of bricks.

In the particular application of the invention herein described, two stations $E^1$ and $E^2$ of the hacking station D are shown, with the main conveyor C located transversely of these two stations so as to deliver columns of bricks G' to each station as required for the purpose of building the hacks. However, should only one pattern of hack be required and the capacity of the brick presses A be limited, only one of the stations $E^1$ or $E^2$ need be employed.

Referring now particularly to FIGS. 5, 6, 7 and 8 of the drawings. A predetermined number of pairs of bricks are allowed to accumulate in a column G' on the main conveyor C in front of the stop paddle 36, which is operated by the torque actuator 37. This stop paddle 36 will be rotated out of the way of the batch of bricks on a signal from the switches 148 to allow the accumulated column of bricks to pass onwards into position transversely of one end of the station E¹ of the hacking station D. At the same time, the cylinder and piston device 39 will actuate the clamp plates 40 to clamp the first pair of the following column of bricks on the conveyor C and hold that pair and consequently all following bricks to separate them from the column of bricks which has been allowed to pass the stop paddle 36.

The column of bricks released by the stop paddle 36 and travelling with the conveyor C are stopped again by the stop paddle 41 operated by the torque actuator 42. The stop paddle 41 locates the column of bricks opposite the station E¹ ready to be transferred from the conveyor C into the station E¹ for the purpose of forming a hack therein.

The stations E¹ and E² are formed of similar machines, each machine comprising a frame 43 supported on legs 44 which can be adjusted as to height and level by the screwed feet 45. A conveyor apron 46 is mounted above the machine frame 43 on suitable end rolls and is engaged by the sprockets 47 and 48. The sprocket 47 and consequently the conveyor apron 46 is driven intermittently by either one of the two torque actuators 49 and 49b through the linkage 50, and levers 51. The torque actuator 49 is set to drive the conveyor apron 46 forwardly a fixed distance. However, for the purpose of obtaining a tie between the bricks of one hack and another in the final hack stack built up on the kiln car, it is sometimes necessary to vary the gap between the column of bricks on the hack being assembled on the conveyor apron 46. This is accomplished by means of the second torque actuator 49b which is set to move the conveyor belt 46 when a gap between columns of bricks different from that provided by the torque actuator 49 is desired. The torque actuators 49 and 49b return the linkage 50—51 to its original position without transmitting reverse motion to the conveyor apron 46, by reason of the overrunning clutches 49a and 49c. A tray 52 is located between the end of each of the stations E¹ and E² and the adjacent edge of the upper course of the main conveyor C and is pivoted about the shaft 53. This tray 52 is moved from a horizontal position to a vertical position 52a, shown in chain dot lines in FIG. 6, by means of the torque actuator 54 and linkage 55.

A shuttle bar 56 extending approximately the width of each of the station E¹ and E² is mounted on the outer end of the pair of rods 57 and has a brick contacting face 56a adapted to move across the upper course of the main conveyor belt C towards the tray 52. The rods 57 are mounted in the bushings 58 in the frame 43 of the machine and are attached at their end remote from the shuttle bar 56 to a cross member 59. A cylinder and piston device 60 is mounted in the frame 43 and is attached to the cross member 59 to effect reciprocation of the shuttle bar 56. The face 56a of the shuttle bar 56 is adapted to engage with the column of bricks on the conveyor C, which has been stopped by the stop paddle 41 and move the column off the conveyor on to the tray 52.

Figures 4, 6:
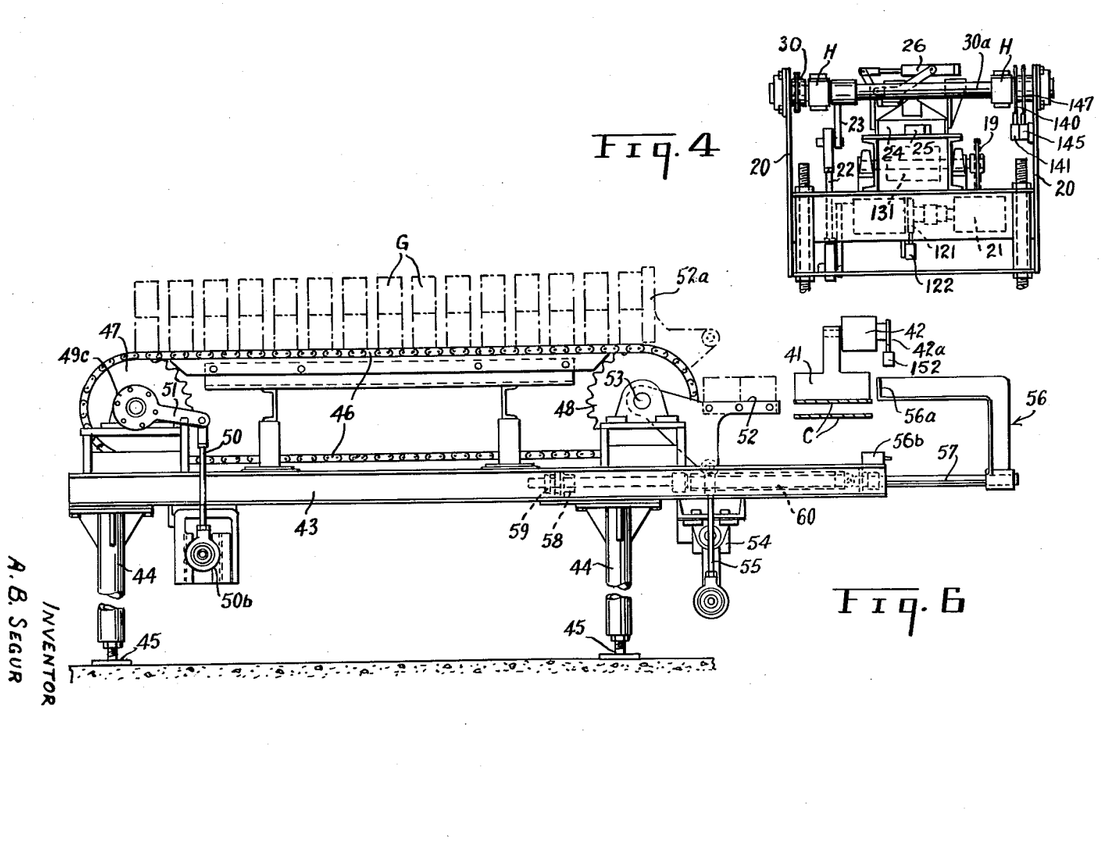
FIG. 4 is a partial end view of the delivery end of the transfer machine shown in FIG. 2.
FIG. 6 is a side elevation of one of the automatic hacking machines in the central hacking station.

After the column of bricks has been pushed off the conveyor C on to the tray 52, the torque actuator 54 is activated to pivot the tray 52 into the vertical position shown in chain dot lines at 52a in FIG. 6 and deposit the column of bricks in two layers, one above the other on the conveyor apron 46. After the column of bricks has been deposited on the conveyor apron 46, the torque actuator 54 returns the tray 52 back to its horizontal position and the torque actuators 49 and 49a are activated to advance the conveyor apron 46 a predetermined distance slightly more than the width of the bricks deposited on the apron, thereby leaving a space for the next column of bricks to be deposited by the tray 52. The torque actuator 49 advances the apron 46 a predetermined set distance, while the torque actuator 49a advances the apron 46 a distance slightly more than that fixed by the actuator 49 in order to achieve the tie effect between the transverse and longitudinal course of bricks to obtain stability in the stack built up on the kiln car. In some cases it may be advisable to have the torque actuator 49b advance the apron slightly less than does the torque actuator 49, depending upon the required spacing. The sequence of depositing double rows of bricks on to apron 46 is repeated until the desired number of courses of bricks for the hack are gathered on the apron.

When transverse and longitudinal hacks of bricks are to be formed, the transverse hacks can be formed on the apron 46 of station E¹ and the longitudinal hacks formed on the apron 46 of station E². After the required amount of courses for the transverse hack have been loaded on the apron 46 of station E¹ a limit switch 61 activates the torque actuator 42 to open the stop paddle 41 to allow a column of pairs of bricks to pass on with the conveyor C towards the station E² at the same time the cylinder and piston device 62 actuates the clamp plates 63 to hold the following pair of bricks stationary on the conveyor C while the column in front moves into position opposite the station E².

The longitudinal hacking station E² is similar in every respect to the hacking station E¹ described above and the operation of transferring the individual batches of bricks from the conveyor C to the conveyor apron 46 is the same in each case with the exception of different spacings between the rows of bricks and a different number of rows of bricks as required between transverse and longitudinal hacks. At the end of the operation of forming the longitudinal hack of bricks at the station E², the sequence of operations is switched back to the transverse hack forming at the station E¹, which has been emptied in the meantime by the operator.

The above description refers to the building up of an oblong hack in which the transverse hack is made up in this case, with columns of five pairs of bricks, and the longitudinal hack is made up of columns of six pairs of bricks. In the case where it is desired to make up square hacks only, the number of rows of bricks on the apron 46 will be identical in both stations E¹ and E².

The two hacking stations E¹ and E² are elevated above floor level on either side of the rail tracks 64 on which the kiln cars 65 run.

A semi-automatic transfer hoisting apparatus is located transversely above the hacking stations E¹ and E² for the purpose of transferring the hacks of bricks formed on the aprons 46 in both hacking stations on to the kiln cars 65. These kiln cars normally carry four hack stacks 66. This transfer hoisting apparatus is so located above the hacking stations E¹ and E² as to accurately pick up and transfer the transverse and longitudinal hack patterns from the conveyor aprons 46 and deposit them on the kiln car 65, and is provided with means whereby the longitudinal course hacks can be turned through 90° so as to build up an accurately placed series of alternate transverse and longitudinal hack on the hack stacks 66.

The transfer hoist assembly 67 includes a pair of rail beams 68, suitably suported above and transversely of the hacking stations E¹ and E². The transverse hoist car 69 is suspended from the rail beams 68 by means of the brackets 70, each of which carries a pair of wheels 71 adapted to run on the lower flange 72 of the rail beams 68. The hoist car 69 supports a pair of vertical guides 73 projecting above and below the hoist car 69. Each vertical guide 73 is composed of a pair of channel members 73a and the guides 73 are joined together by the spaced apart brace members 74.

Hoist slide members 75 are mounted in the guides 73 for vertical movement therein. Each hoist slide member 75 has a brick tong assembly 76 secured to its lower end, the brick tong 76a serving to engage with and lift the hack of bricks from the hacking station E¹ while the brick tong 76b serves to engage with and lift the hack of bricks from the hacking station E².

The means for raising and lowering the brick tongs 76a and 76b comprise a pair of cylinder and piston devices 77a and 77b. The cylinder and piston device 77a and its associated cables and pulleys serving to raise and lower the brick tong 76a while the cylinder and piston device 77b raises and lowers the brick tong 76b. The cables 78 are anchored at one end to the frame of the hoist car 69 at 79 and are led over the pulleys 80 attached to the rods 81 of the cylinder and piston devices 77a and 77b and then led over the pulleys 82 and 83, with the opposite end of the cables 78 being anchored to the brackets 84 on the hoist members 75a and 75b.

Figure 5:
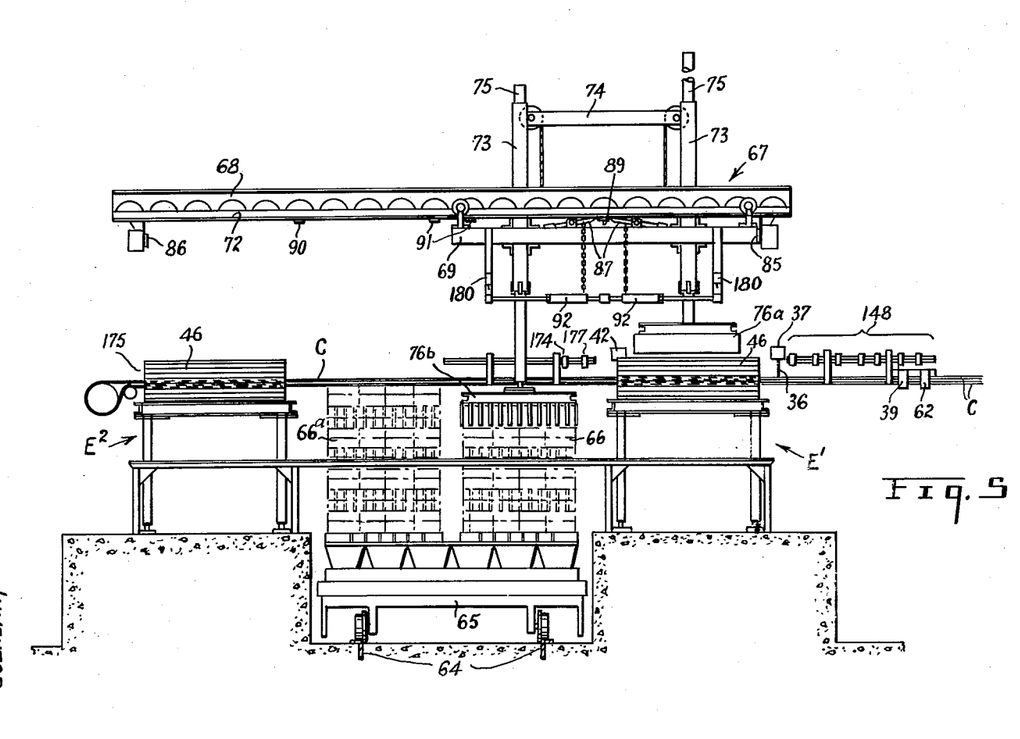
FIG. 5 is a longitudinal vertical elevation of the central hacking station in which longitudinal course and a transverse course hacking machines are located at either side of a kiln car loading station and a semi-automatic hoist apparatus is used to transfer the hack of bricks formed on the hacking machines to the kiln car.
Figure 7:
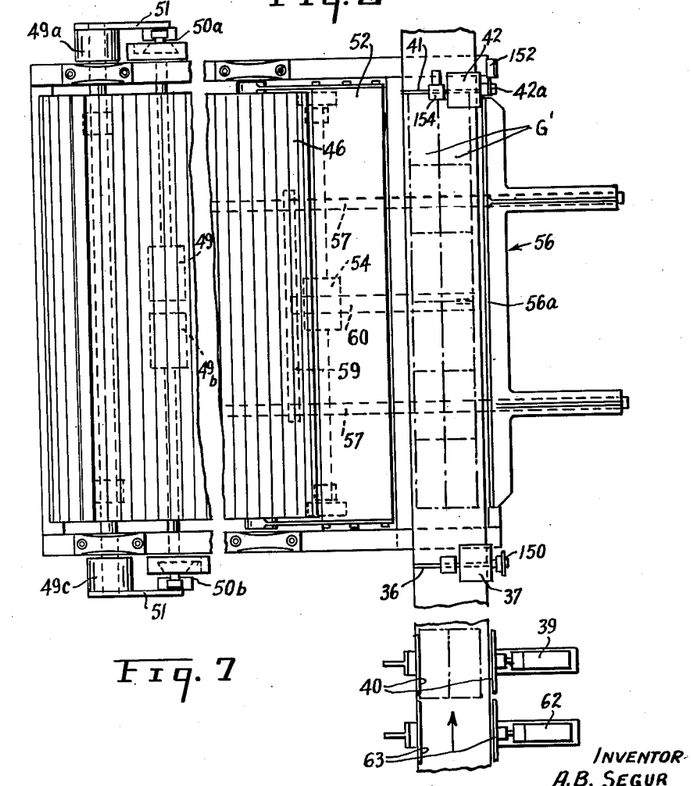
FIG. 7 is a partial plan view of the hacking machine shown in FIG. 6 and showing a portion of the main conveyor belt together with brick clamping means and brick gate and brick stop.

The hoist car 69 can be moved manually along the rail beams 68 and when moved to the right, as seen in FIG. 5, against the stop 85, the right hand brick tong 76a will be accurately located above the conveyor apron 46 of the hacking station E¹, and when it is moved to the left against the stop 86 the left hand brick tong 76b will be accurately located above the conveyor apron 46 of the hacking station E². A pair of locking pawls 87 are pivotally mounted on the shafts 88 on the hoist car 69 and engage against the stops 89 or 90 on the under side of the rail beams 68 for the purpose of locking the hoist car 69 in position over either of the hacking stations E¹ or E². Intermediate locking stops 91 are also provided on the under side of the rail beams 68 to be engaged by the pawls 87 for the purpose of locating and locking the hoist car 69 accurately in an intermediate position over the kiln car 65.

The locking pawls 87 are controlled manually by the operator rotating the sleeves 92 and levers 93 mounted on the bar 94 which is suspended from the hoist car 69 by the brackets 95. Upon rotation of the sleeves 92 the chain 96 which connects the levers 93 with the pawls 87, is pulled down thereby releasing the pawls 87 from engagement with whatever stops they are engaged with. The locking pawls 87 are counterbalanced by the weighted brackets 97 on the shafts 88 to hold the pawls 87 against the under side of the hoist car 69 so that the hoist car will lock in position as soon as one of the pawls 87 overrides a stop.

Figures 9, 11, 12:
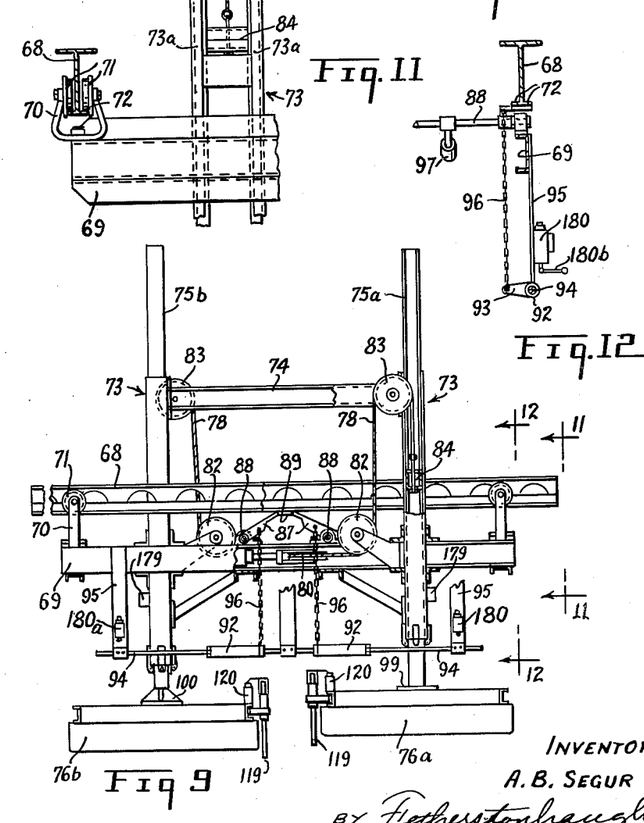
FIG. 9 is a side elevation of the hoist apparatus associated with the central hacking station.
FIG. 11 is an enlarged partial end view of the hoist car support, looking in the direction of the arrows 11—11 in FIG. 9.
FIG. 12 is an enlarged partial vertical section on the line 12—12 of FIG. 9.
Figure 10:
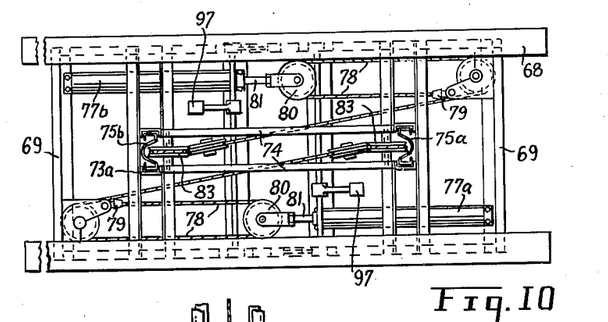
FIG. 10 is a plan view of the hoist apparatus shown in FIG. 9.
Figure 13:
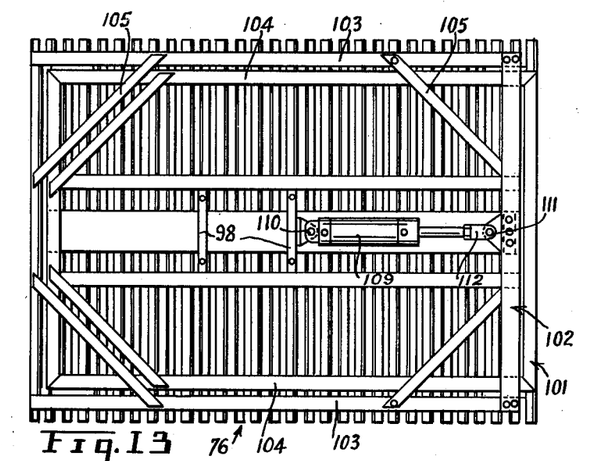
FIG. 13 is a plan view of the brick tong assembly.

The brick tongs 76a and 76b shown in detail in FIGS. 13 to 17 are secured to the lower ends of the hoist slide members 75a and 75b by bolts passed through the cross members 98. In FIG. 9 the brick tong 76a is shown as being secured to its hoist member 75a by a fixed flange 99 while the brick tong 76b is shown as being attached to its hoist member 75b by a rotating head 100.

The brick tongs 76a and 76b each comprise a pair of rectangular frames 101 and 102 lying generally in the same horizontal plane. The inner frame 101 having the cross members 98 can be designated as the fixed member of the tong while the outer frame 102 can be designated as the movable member of the tong. The outer frame 102 has its side members 103 lying parallel with and in spaced relation to the side members 104 of the inner frame 101. The brace members 105 on the top of the frame 102 rest on the top of the frame 104 and serve to hold the frame 102 in the same horizontal plane as the frame 101.

A pair of studs 106 are mounted on the inside of and at one end of the side members 103 of the outer frame 102 and carry rollers 107 which seat in the horizontally disposed slots 108 in the side members 104 of the inner frame 101. A cylinder and piston device 109 is pivotally mounted at 110 on the inner frame 101 and is connected to the outer frame 102 at 111 by means of the rod and clevis 112 to provide for horizontal movement of the outer frame 102 relative to the inner frame 101.

A series of bars 113 are transversely mounted on the under side of the inner frame 101 at equally spaced intervals. Each bar 113 has attached to it a depending tong plate 114. A similar series of bars 115 are transversely mounted on the under side of the outer frame 102 at equally spaced intervals. Each bar 115 has attached to it a depending tong plate 116. These latter tong plates 116 are provided with a series of pips 117 horizontally disposed adjacent the lower edges of the plates 116.

Figure 14:
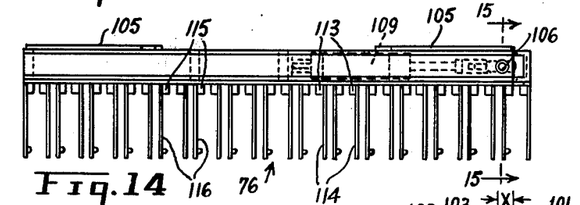
FIG. 14 is a side elevation of the brick tong assembly illustrated in FIG. 13.
Figures 15, 16, 17, 18:
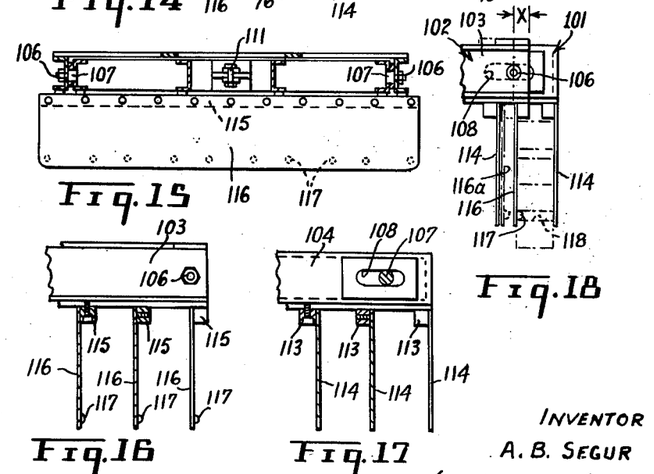
FIG. 15 is a vertical section of the brick tong taken on the line 15—15 of FIG. 14.
FIG. 16 is an enlarged partial vertical elevation of one end of the horizontally movable element of the brick tong.
FIG. 17 is an enlarged partial vertical elevation of one end of the fixed element of the brick tong and showing the roller member of the movable element of the tong in engagement with the slot in the fixed element.
FIG. 18 is a composite vertical elevation of FIGS. 16 and 17 showing in solid lines the tong members in engagement with a pair of bricks, shown in chain dot lines and the displacement of the movable element relative to the fixed element of the tong.

The bars 113 and 115 and their dependent tong plates are interposed with respect to each other as shown in FIG. 14 and when the outer frame 102 is moved to the left the distance "X," shown in FIG. 18, with the tong plates 116 taking up the position shown in chain dot lines at 116a, the brick tong assembly 76a and 76b can be lowered down, by means of the hoist slide members 75a or 75b to between the spaced apart rows of pairs of bricks on the conveyor apron 46. When the cylinder and piston device 109 is activated to move the outer frame 102 to the right, carrying with it the tong plates 116, the pips 117 on the tong plates will engage with the core holes 118 in the lower of the two courses of bricks so as to clamp the separate rows of bricks between adjacent tong plates 114 and 116 to securely hold the complete hack of bricks previously formed on the conveyor apron 46. The complete hack of bricks clamped by the tong plates can now be raised clear of the conveyor apron 46 and the pawls 87 be released from engagement with their stops 89 or 90 and the hoist car 69 can then be moved to bring whichever hack has been lifted into the desired position over the kiln car 65.

Each brick tong 76a and 76b is provided with a gauge for the purpose of slowing up and stopping the downward movement of the loaded brick tongs on to the kiln car 65. This gauge comprises a pin 119 mounted on the side of the tong and normally projecting below the lower edge of the tong plates 114 and 116, and adapted to be pushed upwards on making contact with either the platform of the kiln car 65 or the uppermost course of bricks in the stack 66. Upward movement of the pin 119 operates the switch 120 which in turn stops the downward movement of the tong by cutting off the flow of fluid to the cylinder and piston device 77a or 77b whichever is in action.

Figure 19:
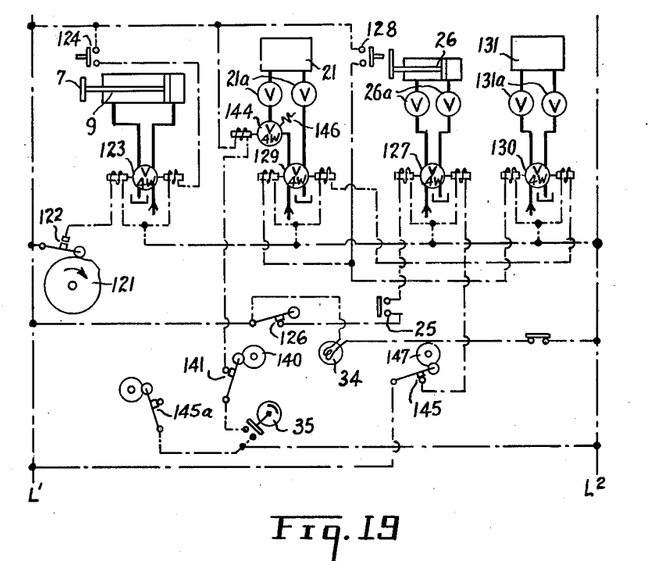
FIG. 19 is a composite hydraulic and electrical diagram in connection with the operation of the transfer machine shown in FIGS. 1 and 2, in which the hydraulic elements and feed lines are shown in solid block lines and the electrical elements and lines are shown in chain dot lines.
Figure 20A:
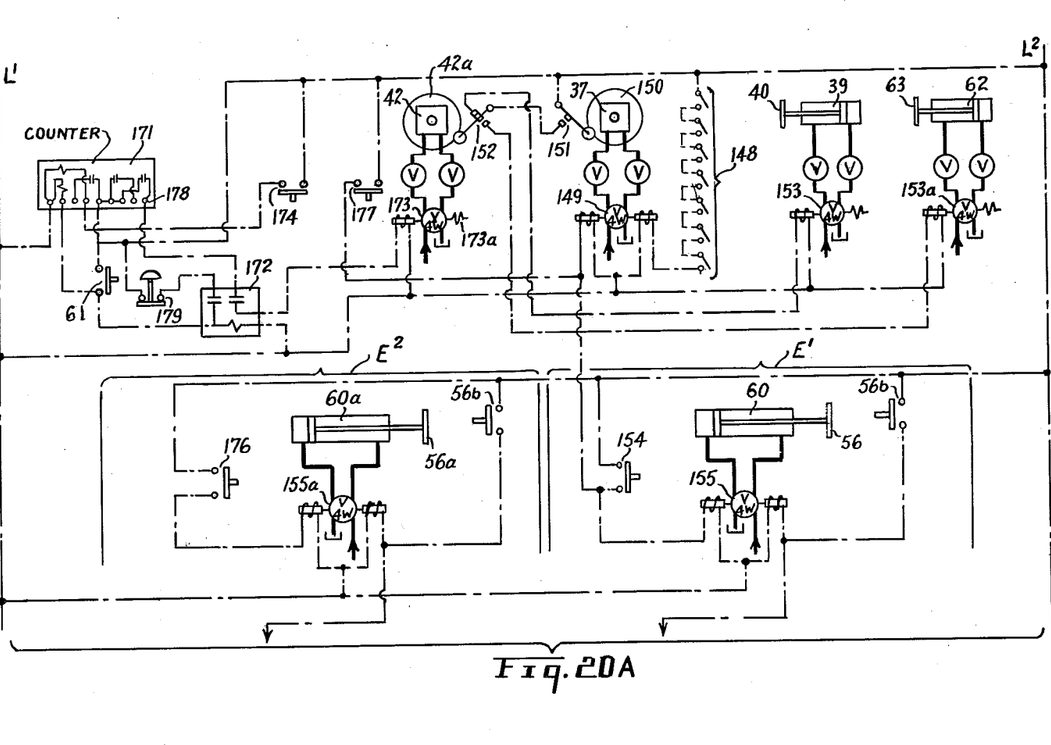
FIGS. 20a and 20b are composite hydraulic and electrical diagrams in connection with the operation of the hacking stations shown in FIGS. 5, 6, 7 and 8, in which the hydraulic elements and feed lines are shown in solid block lines and the electrical elements and lines are shown in chain dot lines.
Figure 20B:
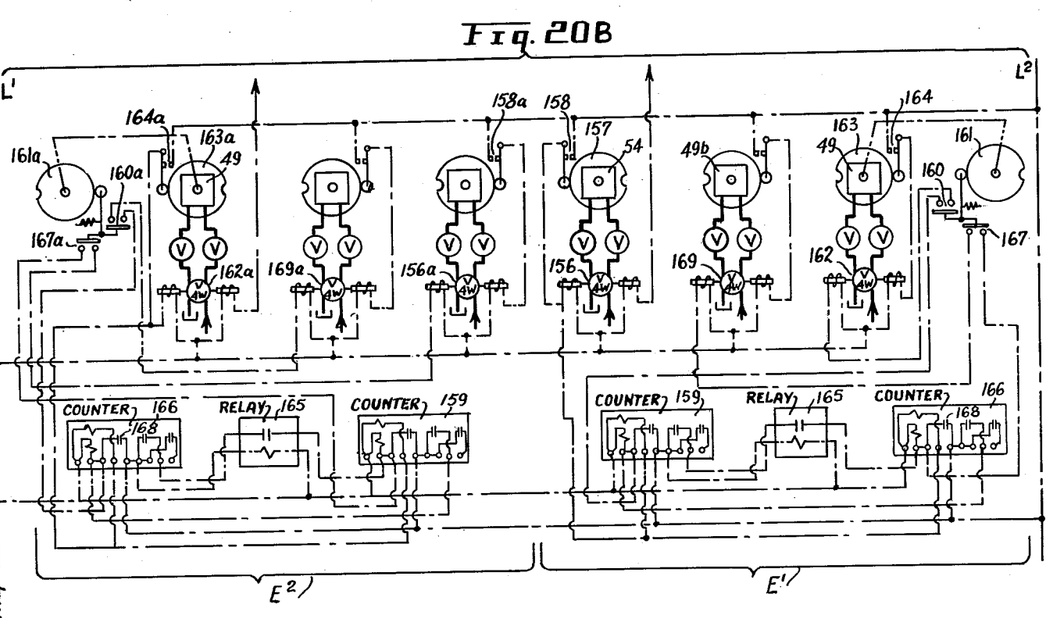
Figure 21:
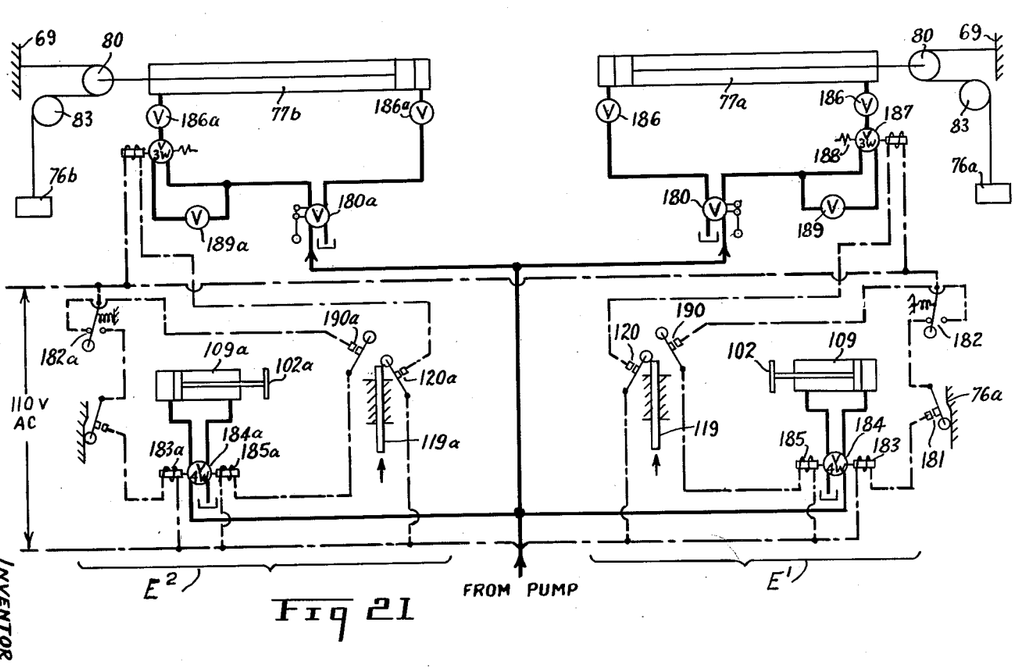
FIG. 21 is a composite hydraulic and electrical diagram in connection with the hoisting apparatus shown in FIGS. 9 and 17 with the hydraulic elements and lines shown in solid block lines and the electrical elements and lines shown in chain dot lines.

Having now described generally the mechanism by means of which the bricks are transferred from the brick presses to the kiln car, the sequence of operation will now be described in relation to the electrical and hydraulic systems by means of which each step in the progress of the bricks from the brick press to the kiln car is controlled. Reference will now be made to the diagrams FIGS. 19 to 21.

*Operation and Control Sequence for Brick Transfer Element B*

Referring particularly to FIGS. 2, 3, 4 and 19. In the description of the diagrams shown in FIGS. 19 to 21 the solid block lines indicate the hydraulic circuits and the chain dot lines indicate the electrical circuits.

In the hydraulic circuits the arrows indicate the direction of input flow of fluid from any common source of supply. In the electrical circuits the supply is from 110 volt lines.

A cam 121, mounted on the main crank shaft of the brick press A momentarily closes the switch 122 just as the bricks are pushed out of the press bed by a shuttle bar not shown. The closing of the switch 122 completes a circuit to the shift four way solenoid valve 123, and causes the cylinder and piston device 9 to retract and, in this case, push four bricks off of the press bed on to the conveyor belt 13. When the cylinder and piston device 9 completes its stroke, the shuttle plate 7 momentarily closes the switch 124 which completes a circuit which in turn reshifts the solenoid valve 123 to return the cylinder and piston device 9 to its extended position.

The conveyor belt 13 carries the four bricks slowly towards the far end of the conveyor until the end brick contacts the stop bar 24. The pressure of the brick on this stop bar 24 closes switch 25.

When and if the transfer arm assembly H is in the horizontal position, series switch 126 is also closed, which in turn completes the circuit through the switch 25 to shift four way solenoid valve 127 to allow fluid to enter cylinder and piston device 26 until the clamp plates 27 has clamped the end pair of bricks on the conveyor 13. Just as the cylinder and piston device 26 has reached its brick clamping position, switch 128 is closed which completes a circuit to the four way solenoid valves 129 and 130. These two valves 129 and 130 energize the torque actuator 131 to momentarily reverse the driven pulley 13a, in order to reverse the conveyor 13 and separate the brick column on the conveyor from the clamped pair of bricks and simultaneously energize the torque actuator 21 to pivot the transfer arm H to a vertical position.

As the transfer arm H nears its vertical position, and the clamped pair of bricks are just clear of the conveyor belt C, cam 140 on the pivot shaft 30a closes switch 141. If there are not any bricks on the main conveyor belt C to interrupt the diagonally disposed light beam from light source 142, the normally open light switch 143 remains open. Consequently the motion of the transfer arm H is not interfered with. However, if a pair of bricks from one of the other transfer machines B happen to be in the disposal area on the belt C, the light beam will be interrupted, which in turn will close switch 143, which in turn will complete a circuit through switch 141 to energize two way solenoid valve 144 and block the free flow of exit fluid from the torque actuator 21. This fluid restriction by the valve 144 will cause the motion of the transfer arm H to be checked.

As soon as the conveyor C clears, the light signal 34 is no longer interrupted and the normally open light switch 35 opens and the fluid restriction by the valve 144 ceases to exist and the motion of the transfer arm H continues. Similarly if the interference from the opposite transfer machine B is passed, the energizing circuit of the solenoid valve 144 is opened. The spring 146 on the valve 144 shifts the valve back to the free fluid flow position, to allow the torque actuator 21 to complete its 180° travel.

Just as the torque actuator 21 completes its 180° travel, cam 147 on the shaft 30a operated from the torque actuator 21 closes switch 145 which completes a circuit to simultaneously reshift the solenoid valves 129, 127 and 130 which respectively retract the cylinder and piston device 26 to unclamp the pair of bricks to allow them to be deposited in the conveyor belt C, and reverse the torque actuator 21 to return the transfer arm H to its horizontal position and to allow the driven pulley 13a to again drive the belt 13.

Switch 145 also acts as an interlock switch with a similar switch 145a on an opposite transfer machine B if two transfer machines feed from opposite sides of the conveyor C on the same centerline, to prevent simultaneous discharge from two opposite machines on to the belt C.

If another pair of bricks are against the stop bar 24 at this time, the above cycle will be immediately repeated. If not, the transfer arm H will remain in the horizontal position until the next pair of bricks reach the transfer position.

Valves 21a regulate the flow of fluid to the torque actuator 21, valves 26a regulate the flow of fluid to the cylinder and piston device 26 and the valves 131a regulate the flow of fluid to the torque actuator 131.

*Operation and Control Sequence for Brick Hacking Stations $E^1$ and $E^2$*

Referring now to FIGS. 5, 6, 7, 8 and 20. The purpose of the hacking stations $E^1$ and $E^2$ is to receive a column of bricks from the main conveyor belt C, with the bricks flat, end to end in two rows, on the belt as deposited thereon by the transfer arm H, and to automatically transfer the column of bricks on edge, one above the other to form a hacking pattern on the conveyor apron 46.

When seven pair of bricks have accumulated on the conveyor belt C behind the stop paddle 36 operated by the torque actuator 37, all seven series connected switches 148 are closed by contact from one of each pair of bricks. The completion of this circuit shifts the four way solenoid valve 149 which in turn allows fluid pressure to actuate the torque actuator 37 and bring its stop paddle 36 up to a horizontal position to allow passage of the column of bricks.

As the stop paddle 36 clears the lead brick on the conveyor belt C, the column of bricks starts to move again with the belt. The rotating movement of the stop paddle 36 must be rapid enough so that the paddle clears the top corner of the lead pair of bricks. After the torque actuator 37 has moved about one degree, cam 150 on the shaft of the actuator 37, closes the limit switch 151. This completes a circuit through switch 152 to energize the four way solenoid valve 153, when stop paddle 41 on the torque actuator 42 is in the vertical or closed position. Solenoid valve 153, when energized, shifts the valve to allow fluid pressure to extend the cylinder and piston device 39 until the clamp plates 40 clamp the sixth pair of brick on the belt C. Since the travel of the clamp plates is less than one inch, this sixth pair of brick will be stopped before it moves an appreciable distance. The five pair of bricks, ahead of the clamped pair, are then free to travel with the belt C as a solid column until the lead pair of brick contacts the stop paddle 41.

In contacting the stop paddle 41, the lead pair of brick closes switch 154, mounted on the stop paddle 41, which completes a circuit to shift the four way solenoid valves 155 and 149 to allow fluid pressure to return the torque actuator 37 and the cylinder and piston device 39 to their original positions and at the same time extend the cylinder and piston device 60. As the cylinder and piston device 60 is extended, the shuttle bar 56 also is carried forward to push the column of a double row of bricks off of the belt C on to the tray 52.

Just as the cylinder and piston device 60 reaches a point near its extended position, the shuttle bar 56 contates and closes the limit switch 56b. The closing of this switch 56b completes a circuit which reshifts the solenoid valve 155 which allows the fluid pressure to retract the cylinder and piston device 60 to its original position.

The momentary closing of the limit switch 56b also completes a circuit to shift the four-way solenoid valve 156 to allow fluid pressure to the torque actuator 54 which in turn pivots the tray 52 from a horizontal position to a vertical position. This motion of the tray 52 transfers the double row of bricks to a vertical position and deposits the bricks on the conveyor apron 46 on edge one above the other, face to face in the hacking station $E^1$. Just as the oscillating shaft of the torque actuator 54 reaches its 180° stop, cam 157 momentarily closes limit switch 158. This completes a circuit to reshift the solenoid valve 156 which allows the fluid pressure differential to return the torque actuator 54 and tray 52 to their original positions.

The pulsing of switch 158 also causes the microflex counter 159 to advance one count during the first two counts of each hack pattern; during this time the holding circuit between the counter 159 and the line $L^2$ is closed, thus making switch 160 effective. When this switch 160 is momentarily closed by cam 161 which is also in the shaft of torque actuator 54, a circuit is momentarily completed to shift the four way solenoid valve 162 to allow the fluid pressure to turn the torque actuator 49 through 180°. This action, through the right crank and pitman arm assembly 50 causes the conveyor apron 46 to advance forward an amount in relation to the crank throw.

Figure 8:
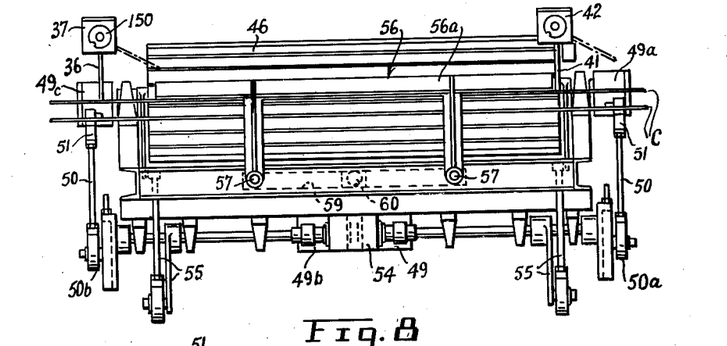
FIG. 8 is an end view of the brick receiving end of the hacking machine shown in FIG. 6.

Just as the torque actuator 49 has contacted its 180° stop, cam 163 on the shaft extension of the actuator 49 momentarily closes switch 164. This completes a circuit which allows the fluid pressure to return the torque actuator 49 to its original position. This return motion is not transferred to the apron 46 because of the overrunning clutch 49a. The above cycle sequence will continue until the microflex counter 159 has reached its preset count, equal to the number of rows of bricks of equal spacing deposited on the apron 46 at the beginning of each hack pattern. After a short predetermined time delay, set on time delay relay 165, the control circuit will automatically be transferred to mircroflex counter 166. During this period each pulse of limit switch 158 causes the counter 166 to step ahead one count; also, to make limit switch 167 effective through the holding contacts 168 of counter 166. Thus when cam 161 on shaft extension of torque actuator 54 momentarily closes switch 167, solenoid valve 169 is energized to shift the valve to allow the fluid pressure to oscillate the torque actuator 49b which in turn advances the apron 46. This action is the same as that described above in connection with the operation of the torque actuator 49 and its drive to the right hand side of the machine as shown in FIG. 8. In order to permit a different spacing between the intermediate rows of bricks forming the hacking pattern on the apron 46, the torque actuator 49 imparts a different advance travel to the apron 46 than that imparted by the torque actuator 49b. The difference in advance travel of the apron 46 is controlled by the setting of the throw of the crank 50a in the drive from the torque actuator 49 and the throw of the crank 50b in the drive from the torque actuator 49b. By means of this difference in advance, travel of the apron 46 resulting in a difference in spacing between certain row of the bricks on the apron 46, a tie is achieved between the transverse and longitudinal hacks in the stack built upon the kiln car.

At the end of the present count of the counter 166 the control is automatically returned to the counter 159 to complete the pattern cycle for the transverse course in the hacking station E$^1$.

When the apron 46 on the transverse hacking station E$^1$ starts to index after the final row of the hacking pattern has been placed on the apron, the lead row of bricks bears lightly against the lever of limit switch 61. This completes a circuit which causes clutch coil of counter 171 to be energized which in turn locks in relay 172 and energizes the four-way solenoid valve 173, when this solenoid valve 173 is energized, the valve is shifted against spring pressure and allows fluid pressure to rotate the torque actuator 42 and thereby open the stop paddle 41 at the transverse hacking station E$^1$.

When the stop paddle 41 is in the open position, the single pole double throw switch 152 is reversed by means of the cam 42a. In this position of the switch 152 the cylinder and piston device 62 is energized by the solenoid valve 153a and the clamp 63 is made effective to clamp a pair of bricks instead of the clamp 40. Now each time that the torque actuator 37 opens the stop paddle 36, the seventh pair of bricks are clamped, thus allowing the remaining six pair of bricks on the conveyor belt C be escaped.

Since the limit switch 154 is mounted on the stop paddle 41 of torque actuator 42, this switch and the stop paddle are ineffective with the stop in the open position. The brick column of 12 bricks then is allowed to flow down the belt C momentarily closing the switch 174 as it passes to reshift the solenoid valve 149 and return the torque actuator 37 to its original position and to continue until the leading bricks contact the fixed end stop 175 for the longitudinal course hacking station E$^2$.

Limit switch 176 is mounted on the fixed brick stop 175 and is momentarily closed by the end pressure of the brick column. The closing of this switch 176 initiates the cycle for each row now on the longitudinal hacking station E$^2$. This cycle is similar to that described for the transverse hacking station E$^1$. In the diagram FIG. 20a, the numerals describing the cylinder and piston device and its associated valves and switches in station E$^2$ have been given a terminal letter "a" to distinguish them from the similar equipment in station E$^1$.

Limit switch 177, closed momentarily by a brick row, is used to return the torque actuator 42 to the closed position and clamp 63 to the open position during the time stop paddle 41 is open. Limit switch 174 is used to pulse the counter 171 as these brick rows pass.

The pattern and the number of rows are preset for the longitudinal course in hacking station E$^2$. At the completion of the longitudinal pattern, counter 171 opens the circuit to the terminal in the counter 171. This allows relay 172 to drop out and the solenoid valve 173 is de-energized which in turn allows the spring 173a to reshift the valve, thus allowing the fluid pressure to actuate the torque actuator 42 and close the stop paddle 41. At this point solenoid valve 149 is shifted to allow the fluid pressure to return the stop paddle 41 to its vertical closed position.

This alternate cycle between the two stations E$^1$ and E$^2$ is repeated until the kiln car 65 is loaded with a stack 66 containing four transverse and three longitudinal courses by means of the hoist car 69. Each kiln car 65 contains four of these hack stacks 66.

At the completion of the seventh course pattern on the transverse hacking station E$^1$, the stop paddle 41 will open as in previous courses. However, since the first course on the next hack must also be a transverse course, some provision must be made to form two transverse courses in succession. To do this the operator manually depresses the switch 179 momentarily just as soon as he has cleared the previous transverse course from the apron 46. The opening of switch 179 allows relay 172 to drop out; this imediately de-energizes the solenoid valve 173 which closes the stop paddle 41 the same as before. The transverse hacking station E$^1$ starts accumulating a pattern for the bottom course of the next hack. When this course is completed, limit switch 170 is contacted by the lead row of bricks. This completes a circuit which causes the clutch coil of the counter 171 to be energized which in turn locks in relay 172 and energizes the solenoid valve 173. The solenoid valve is shifted against the pressure of the spring 173a to allow fluid pressure to rotate the torque actuator 42 and open the stop paddle 41 in the same manner as described above. This time, however, counter 171 starts in counting where it was interrupted by the start of another course of transverse hacks after the completion of the first seven courses, as explained above, due to the fact that the clutch coil of the counter 171 was not released. The next hack is then formed in alternative courses as previously described.

*Operations and Control Sequence for Transfer Hoist*

The purpose of this equipment is to accurately transfer the transverse and longitudinal hacking patterns from the two hacking stations E$^1$ and E$^2$ to the two hack positions on the kiln car 65, with the alternate longitudinal courses turned 90 degrees to the transverse course.

Referring particularly to FIGS. 5, 9, 10 and 21.

As the last row of each hack is being formed on the conveyor apron 46, the operator should have the hoist transfer car 69 positioned against the end stop 85 with the tong assembly 76a in position over the hack pattern in the hacking station E$^1$.

Each hack stack 66 on the kiln car 65 is started with a transverse course. The operator pulls the lever 180b of the manually operated valve 180 down to allow fluid pressure to flow to the cylinder and piston device 77a to cause the tong assembly 76a to lower over the transverse hack pattern.

Just as the tong assembly 76a reaches the grasp position on the row of bricks on the apron 46, a projection on the hoist slide member 75a closes the limit switch 181. This completes a circuit through switch 182 which is closed when the transfer car 69 is in the pick-up position against the end stop 85. The energizing of the right hand solenoid coil 183 shifts the four-way solenoid operated valve 184 to allow fluid pressure to extend the cylinder and piston device 109 which moves the frame 102 of the tong assembly 76a relative to the frame 101 and closes the tong plates 114 and 116 to grip the rows of bricks resting on the apron 46. While the coil 183 is energized, the opposite left hand, coil 185 of the valve 184 is de-energized by opening of the opposite circuit of the double throw switch 181.

The operator then raises the lever on the valve 180 which shifts valve to allow fluid pressure to cause the cylinder and piston device 77a to retract and thus raise the tong assembly 76a with its brick load. The operator then turns the sleeves 92 to disengage the pawls 87 from its stops 88. The transfer car 69 can then be pushed along on the rail beams 68 to the stop position locating the transfer car 69 with relation to the next hack position on the kiln car 65. The sleeve 92 is released just before reaching this car centre line position to allow the pawl 87 to accurately stop the transfer car 69 and locate the hack over kiln car 65. The lever of the valve 180 is then pulled down to shift valve to allow fluid pressure to extend the cylinder and piston device 77a to lower the tong load. The two flow control valves 186 are adjusted to allow the hoist to lower rapidly.

When the pin 119 on the tong assembly 76a contacts the top of the kiln car 65 or the stack 66 on the kiln car, the pin is pushed up and closes the switch 120. Closing of the switch 120 energizes the three-way solenoid operated valve 187 and causes the valve to shift against the pressure of the spring 188. The fluid exhausted from the cylinder and piston device 77a is now forced to divert through the flow control valve 189. This valve 189 is adjusted to cause a greater restriction to permit a slow travel of the last one or two inches of downward travel of the loaded tong assembly 76a before contact with the kiln car or stack.

Just before the loaded tong assembly 76a contacts the kiln car 65 or stack 66, the pin 119 closes switch 190. This switch 190 now completes a circuit through the switch 182 to energize the left hand coil 185 of solenoid valve 184. This reshifts the valve to allow the fluid pressure to retract the cylinder and piston device 109 which in turn releases the tong plates 114 and 116 from the bricks hack.

The operator now lifts the lever of the valve 180 to raise the tong assembly 76a to the top position stop. The operator turns the sleeve 92 to unlock the transfer car 69 and then pushes the transfer car to the opposite longitudinal hacking machine station E². The operator then waits for the longitudinal hack pattern to be completed on the conveyor apron 46.

The operation of the longitudinal course transfer is the same as that described above except that the tong assembly 76b is rotated 90° clockwise while loaded and 90° counter-clockwise on the return travel with the tongs empty. In diagram FIG. 21 the elements in the hacking station E² which are similar to those in hacking station E¹ have been given the same designation numeral but with the added letter "a." Stops, not shown, are provided to keep the tong assembly 76b in end either 90° positions.

The above alternate transfers of transverse and longitudinal hacks are made until the two stacking positions 66 and 66a on the kiln car are loaded with four transverse and three longitudinal double courses. The sequence for the next courses is changed due to the fact that the kiln car train needs to be indexed forward, and also because two transverse courses must follow each other.

The kiln car indexing cycle is initiated by the operator depressing a manual switch momentarily. This is done at the point that the tong assemblies 76a and 76b just clear the brick hack after setting the 14th course at each kiln car position. From this point the car pusher cycle proceeds automatically to spot the next empty car position on the hacking centre line.

After each fourth transverse row, it is necessary to eliminate the normal in between longitudinal course. After the fourth hack is formed on the transverse hacking station E¹, the brick flow will be diverted to the longitudinal hacking station E² as usual. This time, however, the operator, as soon as he is finished lifting up the fourth transverse load and clears it from the apron 46, he momentarily presses the switch 178, FIG. 20a. This diverts the following brick flow to the apron 46 in the transverse hacking station E¹, thus allowing two trransverse loads to be made successively. After this second transverse course, the pattern on the next longitudinal course continues forming from the point at which the pattern was interrupted.

The above described method of collecting green bricks from a number of brick presses and selectively depositing the bricks on to a main conveyor, ensures that there will be a continuous flow of bricks delivered to the control hacking station of the system, without crowding and with all of the bricks in perfect condition due to the elimination of manual handling. The automatic and selective controls of the system ensures that the predetermined number of pairs of bricks will be separated from the continuous flow and brought together in a column in front of either the transverse or the longitudinal hacking station so that the formed hack on either of these stations will be composed of longitudinally spaced apart columns of pairs of bricks, with the bricks set on edge one above the other to form two courses one above the other, i.e. the sides of the bricks normally exposed on a finished wall of a building will be disposed in horizontal planes so that the faces of the bricks contacting each other between the lower and the upper course, will be protected against discolouration by heating gases when the formed hacks are stacked on the kiln car and passed through the kiln.

The hacks as set up in both the transverse and longitudinal hacking stations are proportioned, both as to the number of bricks, their alignment and spacing, that, when transferred from the hacking stations on to a kiln car and a stack is formed thereon consisting of alternate transfer and longitudinal hacks, the bricks of the hacks will be tied together so as to prevent any possibility of the formed stack falling apart on the kiln car in its passage from the central hacking station, through the kiln and to its final unloading station. Furthermore, the uniform stacking of the hacks on the kiln car ensures that uniformly registered passages will be formed through the built up stacks of transverse and longitudinal hacks on the kiln car so that all bricks in the stack will be subjected to a uniform heating, and later cooling, regardless of their location within the stack.

The bricks reaching the final unloading station are of a remarkable uniform texture and colouring and all have at least one face completely free of marking due to contact with heating gases, and due to the complete elimination of manual handling of the bricks, the proportion of rejects by chipping or distortion of the bricks, is kept to a minimum.

The embodiments of the invention in which an exclusive property or privilege is claimed are defined as follows:

1. A hacking machine in which green bricks and the like are formed in a forming machine and are assembled and arranged in pre-set patterns of hacks for loading on a kiln car, comprising, a main conveyor, means to withdraw the green bricks from the brick forming machine and to deposit the withdrawn bricks in pairs on to the said conveyor the said means comprising a first conveyor belt, means to rake the said bricks from the brick forming machine on to said first conveyor belt, a transfer arm, clamping means on said transfer arm whereby a pair of bricks on said first conveyor belt are clamped together and raised by the said transfer arm and deposited on the said main conveyor, and means to reverse the movement of the said first conveyor belt momentarily to hold the forward movement of following bricks while the said clamped pair of bricks are being raised off said first conveyor belt, means to select a predetermined number of pairs of bricks on said conveyor and to feed the selected pairs of bricks in a column along said conveyor, a central hacking station, the said central hacking station comprising a transverse hacking station and a longitudinal hacking station, means to transfer said column of bricks from said conveyor into said hacking stations in which the pairs of bricks are deposited on edge one above the other, means to accumulate a series of columns of bricks in said hacking stations at spaced apart intervals to form a hack of bricks, and means to transfer the formed hack of bricks to a kiln car.

2. A hacking machine in which green bricks and the like are formed in two or more forming machines and are assembled and arranged in pre-set patterns of hacks for loading on a kiln car comprising, a main conveyor, brick transfer means associated with each of the said brick forming machines and with the said main conveyor, said brick transfer means with drawing the green bricks from the brick forming machine and depositing the withdrawn bricks in pairs on the said conveyor, interlock means between any two of said brick transfer means, said interlock means preventing one of said transfer means from depositing a pair of bricks on the said main conveyor when a pair of bricks from the opposite of said transfer means is on the said main conveyor between the two transfer means, means to select a predetermined number of pairs of bricks on said conveyor and to feed the selected pairs of bricks in a column along said conveyor, a central hacking station the said central hacking station comprising a transverse hacking station and a longitudinal hacking station, means to selectively transfer said column of bricks from said conveyor into said hacking stations in which the pairs of bricks are deposited on edge one above the other, means to accumulate a series of columns of bricks in said hacking stations at spaced apart intervals to form a hack of bricks and means to transfer the formed hacks to a kiln car.

3. A hacking machine in which green bricks and the like are formed in a forming machine and are assembled and arranged in pre-set patterns of hacks for loading on a kiln car, comprising a main conveyor, means to withdraw the green bricks from the brick forming machine and to deposit the withdrawn bricks in pairs on the said conveyor, said means comprising a driven conveyor belt, a cylinder and piston device including a shuttle plate adapted to withdraw the bricks from the brick forming machine on to said conveyor belt, a transfer arm, clamp means on said transfer arm, means to operate said clamp means to clamp together a pair of the bricks on said conveyor belt, means to rotate the said transfer arm and bring the clamped pair of bricks over said main conveyor, and means to release said clamp means to deposit the pair of bricks on the said main conveyor, means to select a predetermined number of pairs of bricks on said main conveyor and to feed the selected pairs of bricks in a column along said main conveyor, a central hacking station the said central hacking station comprising a transverse hacking station and a longitudinal hacking station, means to selectively transfer said column of bricks from said main conveyor into said hacking stations in which pairs of bricks are deposited on edge one above the other, means to accumulate a series of column of bricks in said hacking stations at spaced apart intervals to form a hack of bricks, and means to transfer the formed hack of bricks to a kiln car.

4. A hacking machine as set forth in claim 3, in which the clamping means is made operable only when a pair of bricks are driven by the conveyor belt against a stop and in which the stop activates a switch controlling the said clamping means.

5. A hacking machine as set forth in claim 3, in which the said clamping means when activated causes the drive of the said conveyor belt to be reversed momentarily to halt the forward movement of following bricks when the said transfer arm starts to rise.

6. A hacking machine as set forth in claim 3, in which a light and a light sensitive device are associated with the said main conveyor and operate to hold the said clamping means closed until the space on the main conveyor under the clamped pair of bricks is clear to receive the pair of bricks.

7. A hacking machine in which green bricks and the like are formed in a forming machine and are assembled and arranged in pre-set patterns of hacks for loading on a kiln car, comprising, a main conveyor, means to withdraw the green bricks from the brick forming machine and to deposit the withdrawn bricks in pairs on the said main conveyor, means to select a predetermined number of pairs of bricks on said main conveyor, said means comprising a gate, a series of switches activated by the pairs of bricks forming a column in front of said gate, counter means controlling the number of switches to be activated, means to release the said gate to permit the passage of the selected pairs of bricks along the said main conveyor, a central hacking station the said central hacking station comprising a transverse hacking station and a longitudinal hacking station, means to transfer the column of selected pairs of bricks from the main conveyor into said hacking stations in which the column of pairs of bricks are deposited on edge one above the other, means to accumulate a series of columns of bricks in said hacking stations at spaced apart intervals to form a hack of bricks, and means to transfer the formed hack of bricks from either of said stations to a kiln car.

8. A hacking machine as set forth in claim 7, in which clamp means are associated with said gate and said series of switches whereby the pair of bricks following the selected column of pairs of bricks, are clamped and held against following the selected colunm of bricks.

9. A hacking machine in which green bricks and the like are formed in a forming machine and are assembled and arranged in pre-set patterns of hacks for loading on a kiln car, comprising, a main conveyor, means to withdraw the green bricks from the brick forming machine and to deposit the withdrawn bricks in pairs on the said main conveyor, a transverse hacking station adjacent said main conveyor, a longitudinal hacking station adjacent said main conveyor and located beyond said transverse hacking station, means to select a predetermined number of pairs of bricks in a column on said main conveyor, said means selectively counting a different number of pairs of bricks for grouping in a column on said main conveyor for movement thereon to a position adjacent said transverse hacking station and said longitudinal hacking station, said means including a first gate against which the column of pairs of bricks is formed, a second gate forming a separation on said main conveyor between the said transverse hacking station and the longitudinal hacking station, means to operate said first gate to permit the column of bricks to move ahead and to selectively operate the said second gate to hold it closed to stop the column of bricks on the main conveyor adjacent the transverse hacking station and to open the said second gate to permit the column of bricks to move onwards in the conveyor to adjacent the longitudinal hacking station, means in each of said hacking stations selectively operated to transfer the column of pairs of bricks from the main conveyor into the selected hacking station against which the bricks have been stopped on the conveyor, the said means depositing the said column of pairs of bricks in the hacking station on edge one above the other, means to accumulate a series of columns of bricks in the hacking station at spaced apart intervals to form a hack of bricks, and means to transfer the formed hack of bricks to a kiln car.

10. A hacking machine as set forth in claim 9, in which each of said transverse and longitudinal hacking stations includes a piston and cylinder device adapted to effect withdrawal of the column of bricks from the main conveyor on to a receiving tray and means to rotate the said tray and deposit the column of pairs of bricks thereon on edge in the selected hacking stations.

11. A hacking machine in which green bricks and the like are formed in a forming machine and are assembled and arranged in pre-set patterns of hacks for loading on a kiln car, comprising, a main conveyor, means to withdraw the green bricks from the brick forming machine and to deposit the withdrawn bricks in pairs on the said main conveyor, a transverse hacking station adjacent said main conveyor, a longitudinal hacking station adjacent said main conveyor and located beyond said transverse hacking station, means to select a predetermined number of pairs of bricks in a column on said main conveyor selectively adjacent either of said transverse and longitudinal hacking stations, means to transfer the column of bricks from said main conveyor into said hacking stations in which pairs of bricks are deposited on edge one above the other, means to accumulate a series of columns of bricks in said hacking stations at spaced apart intervals to form a hack of bricks, and hoist means located above said transverse and longitudinal hacking stations, said hoist means including two hoist elements one for lifting a hack of bricks in the transverse hacking station and the other for lifting the hack of bricks in the longitudinal hacking station, the hoist element for the longitudinal hacking station being adapted to be rotated through 90°, the said hoist means adapted to lift the completed hacks of bricks from said transverse and longitudinal hacking stations on to a kiln car.

12. A hacking machine as set forth in claim 11, in which the hacks of bricks are deposited on the kiln car in a stack of alternate layers of hacks from the transverse and the longitudinal hacking stations.

13. A hacking machine as set forth in claim 11, in which the kiln car is positioned between the transverse and the longitudinal hacking stations and the hoist means is movable transversely of the two hacking stations and the kiln car.

14. A hacking machine as set forth in claim 11, in which the hoist means includes, a cylinder and piston device for each of said hoist elements and connected therewith for separate raising and lowering of the hoist elements.

15. A hacking machine as set forth in claim 11, in which the hoist means is mounted on a hoist car movable transversely of the said transverse and longitudinal hacking stations and kiln car, and means to register and lock the said lifting elements above their respective hacking stations and above said kiln car.

16. A hacking machine as set forth in claim 11, in which the two hoist elements each have a brick hack engaging tong mechanism mounted thereon, said tong mechanism comprising a fixed frame and a movable frame, a series of transverse tong plates on each of said fixed and movable frames, the said tong plates being vertically disposed below the said frames and the tong plates of one frame being interposed with respect to the tong plates of the other frame and means to move said movable frame with respect to said fixed frame to bring tong plates of the movable frame into engagement with the hack formed in said hacking stations.

17. A hacking machine as set forth in claim 11, in which the two hoist elements each have a brick hack engaging tong mechanism mounted thereon, said tong mechanism comprising a fixed frame and a movable frame, a series of transverse tong plates on each of said fixed and movable frames, the said tong plates being vertically disposed below the said frames and the tong plates of one frame being interposed with respect to the tong plates of the other frame, the said tong plates having a depth below the said frames approximately that of the two courses of bricks forming the hack in the hacking stations and a piston and cylinder device mounted in said fixed frame and adapted to move said movable frame to bring the tong plates of the movable frame into engagement with the brick hack formed in said hacking stations.

18. A hacking machine as set forth in claim 11, in which the two hoisting elements each have a brick hack engaging tong mechanism mounted thereon, each of said tong mechanisms having a surface engaging gauge member projecting below said tong mechanism, and means associated with said gauge member to effect the opening and closing of said tong mechanism when the said gauge member is moved in contact with a surface below.

19. A hacking machine as set forth in claim 11, in which the hoist means includes a hoist car movable transversely of the said transverse and longitudinal hacking stations, a pair of spaced apart vertical guides in said hoist car, the said hoist elements each having a slide member mounted for reciprocation in each of said guides, a pair of cylinder and piston devices mounted in said hoist car, and means connecting each of said slide members with one of said cylinder and piston devices to effect individual raising and lowering of the said hoist elements.

References Cited in the file of this patent

UNITED STATES PATENTS

| | | |
|---|---|---|
| 1,786,608 | Halstead | Dec. 30, 1930 |
| 2,687,813 | Verrinder et al. | Aug. 31, 1954 |
| 2,746,613 | Meyer et al. | May 22, 1956 |
| 2,800,992 | Kuper | July 30, 1957 |
| 2,955,717 | Segur et al. | Oct. 11, 1960 |

FOREIGN PATENTS

| | | |
|---|---|---|
| 889,423 | Germany | Sept. 10, 1953 |